US011993684B2

(12) United States Patent
Collias et al.

(10) Patent No.: US 11,993,684 B2
(45) Date of Patent: May 28, 2024

(54) RECYCLING OF SUPERABSORBENT POLYMER WITH A HYBRID OXIDATIVE DEGRADATION AND HIGH SHEAR MIXING

(71) Applicant: The Procter & Gamble Company, Cincinnati, OH (US)

(72) Inventors: Dimitris Ioannis Collias, Mason, OH (US); Gary Wayne Gilbertson, Liberty Township, OH (US); Martin Ian James, Hamilton, OH (US); Morgan Christine McGrath, Cincinnati, OH (US); Raul Victorino Nunes, Clarksville, OH (US); Heitham Darrell Safi, West Chester, OH (US); Arsen Arsenov Simonyan, Hessen (DE); John Christopher Wesner, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 165 days.

(21) Appl. No.: 17/678,707

(22) Filed: Feb. 23, 2022

(65) Prior Publication Data

US 2022/0267561 A1 Aug. 25, 2022

Related U.S. Application Data

(60) Provisional application No. 63/152,402, filed on Feb. 23, 2021.

(51) Int. Cl.
*C08J 11/16* (2006.01)

(52) U.S. Cl.
CPC ............ *C08J 11/16* (2013.01); *C08J 2333/02* (2013.01)

(58) Field of Classification Search
USPC ...................................................... 521/40.5
See application file for complete search history.

(56) References Cited

U.S. PATENT DOCUMENTS

| | | | |
|---|---|---|---|
| 5,731,483 A | 3/1998 | Stabel et al. | |
| 6,143,820 A | 11/2000 | Klier | |
| 6,180,845 B1 | 1/2001 | Catallo et al. | |
| 8,383,746 B2 | 2/2013 | Torii | |
| 9,095,853 B2 | 8/2015 | Somma | |
| 9,156,034 B2 | 10/2015 | Somma | |
| 9,822,203 B2 | 11/2017 | Haag | |
| 2004/0034262 A1 | 2/2004 | Van et al. | |
| 2004/0232046 A1 | 11/2004 | Tanaka et al. | |
| 2006/0280669 A1 | 12/2006 | Jones | |
| 2009/0267349 A1 | 10/2009 | Spitzauer et al. | |
| 2009/0314700 A1 | 12/2009 | Mabuchi | |
| 2010/0180805 A1 | 7/2010 | Cheiky | |
| 2010/0221158 A1 | 9/2010 | Kitamura et al. | |
| 2010/0287825 A1 | 11/2010 | Humphreys | |
| 2011/0094674 A1 | 4/2011 | Oetjen | |
| 2012/0302445 A1 | 11/2012 | Rudolph et al. |
| 2013/0296619 A1 | 11/2013 | Iaccino et al. |
| 2016/0237617 A1 | 8/2016 | Yamaguchi et al. |
| 2016/0362609 A1 | 12/2016 | Ward et al. |
| 2017/0198105 A1 | 7/2017 | Lee et al. |
| 2017/0226436 A1 | 8/2017 | Gillespie et al. |
| 2017/0362512 A1 | 12/2017 | Hornung et al. |
| 2019/0299181 A1 | 10/2019 | Flynn et al. |
| 2020/0071619 A1 | 3/2020 | Humphreys et al. |
| 2020/0149220 A1 | 5/2020 | Konishi et al. |
| 2020/0238574 A1 | 7/2020 | Konishi et al. |
| 2020/0369966 A1 | 11/2020 | Bitting et al. |
| 2021/0130262 A1 | 5/2021 | Wu et al. |
| 2021/0130699 A1 | 5/2021 | Bitting et al. |
| 2022/0097279 A1 | 3/2022 | Van Zijl et al. |
| 2022/0117800 A1 | 4/2022 | Collias et al. |
| 2022/0119618 A1 | 4/2022 | Collias |
| 2022/0134398 A1 | 5/2022 | Collias et al. |

FOREIGN PATENT DOCUMENTS

| | | | |
|---|---|---|---|
| CN | 102762615 | * | 10/2012 |
| DE | 4204094 A1 | | 8/1993 |
| EP | 1990106 A1 | | 11/2008 |
| EP | 3783054 A1 | | 2/2021 |
| EP | 3783056 A1 | | 2/2021 |
| JP | 2007007622 A | | 1/2007 |
| JP | 2013199626 A | | 10/2013 |
| KR | 102341361 B1 | | 12/2021 |
| WO | 2016151120 A1 | | 9/2016 |
| WO | 2021042113 A1 | | 3/2021 |
| WO | 2022011241 A1 | | 1/2022 |
| WO | 2022093523 A1 | | 5/2022 |

OTHER PUBLICATIONS

CN102762615 see machine translation (Year: 2012).*
PCT Search Report and Written Opinion for PCT/US2022/070788 dated Jul. 20, 2022, 14 pages.
All Office Actions; U.S. Appl. No. 17/498,781, filed Oct. 12, 2021.
All Office Actions; U.S. Appl. No. 17/498,783, filed Oct. 12, 2021.
All Office Actions; U.S. Appl. No. 17/498,780, filed Oct. 12, 2021.
Anita Gerina-Ancane et al. "Research and analysis of absorbent hygiene product (AHP) recycling", Engineering for Rural Development, Jelgava, 25-27, Dated May 2016, 7 Pages.
Basedow, A. M., and Ebert, K. H, "Ultrasonic Degradation of Polymers in Solution", Advances in Polymer Science, 22, Year 1977, pp. 83-148.
Ching Teck Wei et al: "Microwave-Assisted HydrothermalDecomposition of Super Absorbent Polymers", ACS Sustainable Chemistry & Engineering, vol. 8, No. 38, Dated Aug. 31, 2020 (Aug. 31, 2020), pp. 14504-14510, XP055886586.

(Continued)

*Primary Examiner* — Terressa Boykin
(74) *Attorney, Agent, or Firm* — Kathleen Y. Carter; James E. Oehlenschlager

(57) ABSTRACT

New process for recycling of poly(acrylic acid)-based superabsorbent polymer (SAP) using a synergistic combination of high shear mixing device and oxidative degradation of SAP to produce poly(acrylic acid) (PAA) useful to recycle pre- and post-consumer SAP.

26 Claims, 12 Drawing Sheets

(56) References Cited

OTHER PUBLICATIONS

Ebrahimi, R., et. al., "The Study of Ultrasonic Degradation ofSuperabsorbent Hydrogels", Organic Chemistry International,20, Year 2012, Article ID 343768, doi:10.1155/2012/34376, pp. 1-5.

Jin et al., Conversion of polyethylene waste into clean fuels and waxes via hydrothermal processing (HTP), https://doi.org/10.1016/j.fuel.2020.117726, Fuel 273, Year 2020, 117726, pp. 1-11.

Jin et al., Low-pressure hydrothermal processing of mixed polyolefin wastes into clean fuels, https://doi.org/10.1016/j.fuel.2021.120505, fuel 294, Year 2021,120505, pp. 1-9.

Nakano Akihiko et al.,"Degradation of Aqueous Poly(acrylic Acid) and Its Sodium Salt Solutions by High-Speed Stirring", Journal of Applied Polymer Science, vol. 22, XP055927139, Retrieved from the internet: URL:https://onlinelibrary.wiley.com/doi/abs/10.1002/app.1978.070220813, Dated Apr. 1, 1978, pp. 2207-2215.

Odegard: "LCA of waste treatment of diaper material", XP055886650, Dated May 30, 2018, pp. 37. Retrieved from the Internet: URL :https ://cedelft. eu/wp-content/uploads/sites/2/2021 /04/CE_Delft_2M03_LCA_of_waste_treatment_of_diaper_material_Def.pdf[retrieved on Feb. 2, 2022].

Prajapat, A. L., and Gogate, P. R., "Ultrasonics Sonochemistry", vol. 32, Year 2016, pp. 290-299.

Shukla, N. B., and Madras, G., "Photo, Thermal, and Ultrasonic Degradation of EGDMA-Crosslinked Poly(acrylic acid-co-sodium acrylate-co-acrylamide) Superabsorbents", Journal of Applied Polymer Science, vol. 125, Year 2012, pp. 630-639.

Shukla, N. B., et al., "Ultrasonic Degradation of Poly(acrylic acid)", Journal of Applied Polymer Science, vol. 112, Dated Jan. 23, 2009, pp. 991-997.

Xinming Li et al: "Ultraviolet-induced decomposition of acrylicacid-based superabsorbent hydrogels crosslinked with N,N-methylenebisacrylamide", Journal of Applied Polymer Science, vol. 108, No. 6, Dated Jun. 15, 2008, pp. 3435-3441, XP055741088, US, ISSN: 0021-8995, DOI: 10.1002/app.27865.

Yuriy Budyk et al. "Hydrothermal carbonization of disposable diapers", Journal of Environmental Chemical Engineering, vol. 7, Dated Aug. 2, 2019, 7 pages.

Adebayo-Ige et al. "Mixed Plastics Waste to Ethylene and Propylene Feedstocks", Senior Design Reports (CBE), University of Pennsylvania, Scholarly Commons, Department of Chemical & Biomolecular Engineering, Apr. 21, 2020, 269 pages.

Xu et al., "Hydrothermal Liquefaction of Biomass in Hot-Compressed Water, Alcohols, and Alcohol-Water Co-solvents for Biocrude Production", Application of Hydrothermal Reactions to Biomass Conversion, Green Chemistry and Sustainable Technology, Chapter 8, Jan. 1, 2014, pp. 171-187.

Soni, et al., "Thermochemical Recycling of Waste Plastics by Pyrolysis: A Review", In Journal of Energy & Fuels, 1 vol. 35, Issue 16, Aug. 19, 2021, pp. 12763-12808.

\* cited by examiner

RECYCLING OF SUPERABSORBENT POLYMER WITH A HYBRID OXIDATIVE DEGRADATION AND HIGH SHEAR MIXING

FIELD OF THE INVENTION

The present invention generally relates to a new process for recycling of poly(acrylic acid)-based superabsorbent polymer (SAP) using a synergistic combination of high shear mixing device and oxidative degradation of SAP to produce poly(acrylic acid) (PAA) useful to recycle pre- and post-consumer SAP. The process (method) includes dispersing the SAP and chemically reacting it with oxidizing agent and subjecting the various components of the composition to high shear mixing of at least 20 W/kg. Adding a bleaching agent to lighten the color of the PAA solution making it possible to combine it with virgin PAA to make SAP containing recycled PAA, as well as to use it in other industrial applications.

BACKGROUND OF THE INVENTION

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. About 97% of SAP produced today is used in AHP applications, whereas the remainder about 3% is used in other applications, such as agricultural or horticultural water-retaining agents, and industrial waterproofing agents. Recycling of AHPs involves cleaning of the AHPs from the soils accumulated during their use and separating the various components into recycled material streams. More specifically, the recycled SAP material stream can be used in applications less demanding than AHPs (since the recycled SAP has inferior properties compared to virgin SAP; for example, agricultural or horticultural water-retaining agents, and industrial waterproofing agents) and/or can be converted to essentially non-crosslinked, and slightly branched or linear poly(acrylic acid) (PAA). Then, this PAA can be used as a feed material to various applications. For example, the PAA can be: 1) used as-is in applications such as water treatment or corrosion inhibition; or 2) esterified and then used in adhesives, coatings, etc.; or 3) re-polymerized and re-crosslinked back to SAP; or 4) blended with virgin SAP. The first two sets of applications are part of the effort to recycle SAP into other products by replacing virgin acrylic-acid-based compounds with compounds derived from recycled SAP, whereas the last two sets of applications are part of the circular economy of SAP, i.e., recycling SAP back to SAP. In all cases, the objective is to achieve the same properties as virgin materials.

Non-limiting examples of processes that produce purified and separated material streams of used SAP from recycled AHPs are disclosed and claimed in U.S. Pat. No. 9,095,853 B2, issued on Aug. 4, 2015; and 9,156,034 B2, issued on Oct. 13, 2015; both assigned to Fater S.p.A, based in Pescara, Italy.

Recycling small particle size SAP collected from diaper lines and/or from SAP suppliers using depolymerization reactions to produce PAA that can be mixed with virgin PAA to make SAP with the required particle size for disposable diapers or used as PAA for broad range of industrial applications, non-limiting to paints, resins, adhesives, detergents.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

Ultrasonic degradation of SAP is described in: (1) Ebrahimi, R., et al., *Organic Chemistry Intl*, 2012, Article ID 343768, 5 pages; and (2) Shukla, N. B., and Madras, G., *J. Appl. Polym. Sci.*, 125 (2012), 630-639. Ultrasonic degradation of PAA is described in: (1) Shukla, N. B., et al., *J. Appl. Polym. Sci.*, 112 (2009), 991-997; and (2) Prajapat, A. L., and Gogate, P. R., *Ultrason. Sonochem.*, 32 (2016), 290-299. Also, a general description of ultrasonic degradation of polyers in solution is given in: Basedow, A. M., and Ebert, K. H., *Adv. Polym. Sci.*, 22 (1977), 83-148.

For the degradation of SAPs, both references used viscosity as a measure of the degradation level and found that it takes about 5 to 10 min to reduce the viscosity by one order of magnitude, e.g. from 10 Pa s to 1 Pa s, which indicates that a lot of energy is needed to achieve that level of degradation. For the degradation of linear polymers, the main themes from these references (as well as other references that report on the use of UV, thermal, and other forms of energy) are that the (1) preferential scission is at the mid-point of the polymer chain, (2) the higher molecular weight chains are degraded at a higher rate than the lower molecular weight chains, and (3) there is a minimum molecular weight below which degradation or de-polymerization does not occur. In all cases, the ultrasonic degradation of polymers is due to cavitation, and fast growth and collapse of the resulting microbubbles.

Accordingly, there is a need to recycle SAP from both AHPs and fines from both diaper lines and SAP suppliers. For the recycling of SAP, there is a need to degrade SAP into poly(acrylic acid) (PAA), in relative short time scale. The combination of chemical reaction with strong oxidizer and high shear to disperse and hydrate the SAP, and to increase mass transfer which is critical accelerate for the polymerization reaction. This new hybrid process enables scale up to large scale required for commercialization.

Accordingly, there are sustainability benefits for degradation to PAA only if the energy spent during the converting of SAP to PAA is less than that used to make fossil-derived acrylic acid (petro-AA) from propylene, which is about 50 MJ/kg AA. The PAA produced from SAP can then be incorporated back into virgin SAP (thus increasing its recycled content and supporting the circular economy of SAP) and/or derivatized into materials for other applications, such as, adhesives, coatings, water treatment, fabric care, etc.

SUMMARY OF THE INVENTION

The present invention fulfills the need described above by providing a commercially viable process for depolymerizing superabsorbent polymer (SAP) to poly(acrylic acid) (PAA); reacting the SAP with an oxidizer under high shear mixing and adding one or more bleaching chemicals to lighten the color specks so as to make them unobservable by consumer.

The present invention fulfills the need described above by providing a commercially viable process for degrading superabsorbent polymer (SAP) based on acrylic acid monomer to poly(acrylic acid) PAA which includes the steps of: a) forming a solution, wherein the solution comprises an oxidizer in water at a temperature and a concentration; b) dispersing the SAP into the solution at a concentration using a mixer with power input NP/M greater than about 20 W/kg solution; and c) reacting said oxidizer with said SAP for a period of time to produce said PAA.

In embodiments of the present invention a process for degrading acrylic acid based superabsorbent polymer (SAP) to poly(acrylic acid) PAA is provided that comprises forming a solution, wherein the solution comprises an oxidizer soluble salt in water at a dissolution temperature and a dissolution concentration; dispersing SAP into the solution, forming an SAP dispersion having a viscosity, using a mixer with power input NP/M greater than about 20 W/kg solution; and reacting said oxidizer with said SAP at a reaction temperature and for a reaction time to produce a PAA solution having a viscosity.

In embodiments of the present invention, a method for degrading a superabsorbent polymer (SAP) to poly(acrylic acid) (PAA) is presented. The method comprises two steps: dispersing the SAP and depolymerizing/reacting it to PAA. First, dispersing step of the said SAP into the high shear mixer device containing an aqueous solution with the oxidizing agent; wherein the mixture comprised said SAP concentration greater than about 1% wt, and the said oxidizer Potassium Persulfate concentration greater than about 0.25 g per 100 g of SAP; the said SAP and oxidizing agent was divided in four aliquots and added approximately every 15 min. while maintaining NP/M (Net Power per Mass) greater than about 20 W/kg, and temperature greater than about 60° C.; total dispersion time greater than about 5 min. Second, depolymerizing and reacting the SAP material for more than about 5 min. while maintaining NP/M greater than about 20 W/kg, and temperature greater than about 60° C.

In embodiments of the present invention, a method for degrading a superabsorbent polymer (SAP) to poly(acrylic acid) (PAA) is presented. The method comprises the two steps described above; and the said oxidizer Sodium Persulfate concentration greater than about 0.25 g per 100 g of SAP; the said SAP and oxidizing agent was divided in four aliquots and added approximately every 15 min while maintaining NP/M (Net Power per Mass) greater than about 20 W/kg, and temperature greater than about 60° C.; total dispersion time greater than about 5 min.

In another embodiment of the present invention, a method for degrading a superabsorbent polymer (SAP) to poly(acrylic acid) (PAA) is presented. The method comprises two steps: dispersing the SAP and depolymerizing/reacting it to PAA. First, dispersing step of the said SAP into the high shear mixer device containing an aqueous solution with the oxidizing agent and the bleaching chemical; wherein the mixture comprised said SAP concentration greater than about 1% wt, the said oxidizer Sodium Persulfate concentration greater than about 0.25 g per 100 g of SAP; and the said bleaching agent Hydrogen Peroxide concentration greater than about 0.25 g per 100 g of SAP; the said SAP, oxidizing agent, and bleaching agent was divided in four aliquots and added approximately every 15 min. while maintaining NP/M (Net Power per Mass) greater than about 20 W/kg, and temperature greater than about 60° C.; total dispersion time greater than about 5 min. Second, depolymerizing and reacting the SAP material for more than about 5 min. while maintaining NP/M (Net Power per Mass) greater than about 20 W/kg, and temperature greater than about 60° C.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I Definitions

Figure 1C:
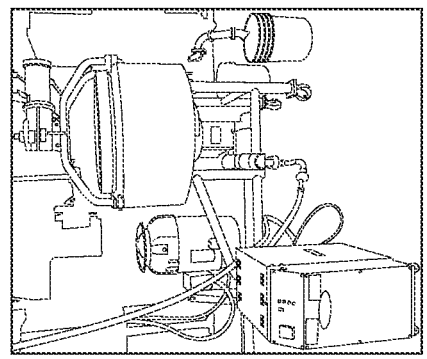
FIG. 1C is a picture of a 25 hp motor equipment setup. System equivalent to 1a. with exception of 25 hp motor installed.

As used herein, "superabsorbent polymers" refer to absorbent materials which are crosslinked and poly(acrylic acid)-based superabsorbent polymers that can absorb at least 10 times their weight of an aqueous 0.9% saline solution as measured using the Centrifuge Retention Capacity (CRC) test method (EDANA method NWSP 241.0.R2). SAP that absorbs water or aqueous solutions becomes a gel. These polymers are typically used in particulate forms ("superabsorbent polymer particles"). The term "particles" refers to granules, fibers, flakes, spheres, powders, platelets and other shapes and forms known to persons skilled in the art of superabsorbent polymer particles. The superabsorbent polymer particles may be spherical-like superabsorbent polymer particles or ellipsoidal-like superabsorbent polymer particles or irregular-like superabsorbent polymer particles or fibers-like superabsorbent polymer particles, i.e. elongated, acicular superabsorbent polymer particles.

As used herein, the term "poly(acrylic acid)" or "PAA" refers to an essentially un-crosslinked and partially neutralized poly(acrylic acid) molecule with acrylic acid as the monomeric unit. In contrast to SAP, PAA are water-soluble. The PAA of the present invention may be linear or branched. The PAA of the present invention may comprise oxygen-containing side- or end-groups due to the reaction mechanism of the present invention. The PAA may further comprise very small quantities of the reaction product of crosslinkers which were used when making the SAP provided to the method of the present invention for degradation. The SAP provided for the present invention may comprise less than 0.2 mol-% of the reaction product of crosslinkers based on the amount of acrylic acid. For the purposes of the present invention, PAA includes polymers of acrylic acid and oligomers of acrylic acid. Preferably, PAA are polymers having an average molecular weight $M_w$ of up to 10 MDa, more preferably up to 1 MDa. More preferably, the PAA are polymers having an average molecular weight $M_w$ of at least 1 kDa, or at least 5 kDa, or at least 10 kDa.

As used herein, the term PAA solution refers to the product of the depolymerization reaction containing PAA in an aqueous solution.

As used herein, the term "degradation" refers to the conversion of SAP into PAA via the actions of partial de-polymerization, de-crosslinking, molecular backbone breaking, or any combination of the above actions. For the purposes of the present invention, the terms degradation, recycling, and conversion are used interchangeably, as long as they refer to the transformation of SAP to PAA. Also, the degradation essentially preserves the carboxylic groups of the SAP and thus the product PAA contains those carboxylic groups. Note that full de-polymerization of SAP should lead to acrylic acid (AA).

As used herein, the term "absorbent-hygiene product", "AHP" refers to devices that absorb and contain body exudates, and, more specifically, refers to devices that are placed against or in proximity to the body of the wearer to absorb and contain the various exudates discharged from the body. Absorbent articles include diapers (e.g. baby diapers and diapers for adult incontinence), absorbent pants, absorbent inserts, feminine care absorbent articles such as sanitary napkins or pantiliners, and the like. The term "exudates" includes, but is not limited to, urine, blood, vaginal discharges, sweat and fecal matter. Preferred AHPs of the present invention are diapers, absorbent pants and/or feminine care absorbent articles. AHPs from which post-industrial or post-consumer SAP's, which may be provided for the method of the present invention, may be derived may be disposable.

As used herein, "disposable" is used in its ordinary sense to mean an article that is disposed or discarded after a limited number of usages over varying lengths of time, for example, less than 20 usages, less than 10 usages, less than 5 usages, or less than 2 usages. If the disposable absorbent article is a diaper, a pant, sanitary napkin, sanitary pad or wet wipe for personal hygiene use, the disposable absorbent article may (and most often is) intended to be disposed after single use.

As used herein, "% wt" or "wt %" terms are abbreviations for concentration expressed as weight percentage. Unless otherwise specified, the wt % refers to concentration with respect to the total concentration of the sample or solution or batch described.

Non-limiting examples of oxidizers of oxidizing agents referenced in the oxidative degradation are Potassium Persulfate, Sodium Persulfate, and Hydrogen Peroxide. Non-limiting examples of bleaching agents include Hydrogen Peroxide. As used herein, the term "KPS" refers to abbreviation for the chemical oxidizer potassium persulfate. As used herein, the term "NaPS" refers to abbreviation for the chemical oxidizer sodium persulfate. As used herein, the term "HPO" and "$H_2O_2$" refers to abbreviations for the chemical oxidizer and bleaching agent hydrogen peroxide.

As used herein, the term High Shear refers to the mixing energy delivered to the mass in the batch tank and measured using the NP/M. The dispersion of the SAP into the aqueous solution containing the oxidizer goes thru an initial very viscous gel requiring high shear, NP/M greater than 10 W/kg. The High Shear is critical for effective transport of the reactants delivering the mass transfer required to accelerate the reaction reducing batch cycle time.

II Methods & Measurement Descriptions

The means for subjecting the components to the mixing energy may be selected from a variety of well-known apparatuses (energizing means) that are commercially available. There are several high shear mixer designs, among them, rotor/stator high shear mixers, commercially available from Charles Ross & Son, Hauppauge, NY may be useful. Inline mixers such as those available from Quadro Inc., Millburn, NJ, as model Quadro ZC/XC are useful as well. Other particularly useful energizing means include batch mixers with bottom driven impellers providing high levels of shear required in the food industry for purees, cheese slurries, whey solids and frozen products, among them the Breddo Likwifer®, EnSight Solutions, LLC, Kansas City, MO and APV Flex-Mix™, SPXFlow, Charlotte, NC. These bottom mixers are used for applications requiring high levels of NP/M.

Non-limiting examples of high shear blenders are the Breddo Likwifer®, and APV Flex-Mix™. As used herein, the term "Likwifier" refers to the Breddo Likwifer® equipment. The Likwifier equipment details as described in FIG. 1A. was used in Examples documented.

Figure 1B:
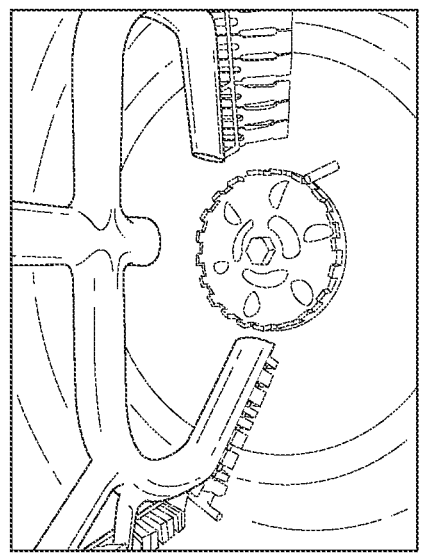
FIG. 1B is a picture of the inside vessel bottom of the High shear blender unit, Likwifier High Shear impeller with 9⅝ inch diameter (equivalent to about 0.24 m). The tank jacket and hot water was used for heat transfer to control and maintain the temperature during the dispersion and depolymerization reaction.

A non-limiting configuration is the Breddo Likwifer® high shear impeller with tooth on the impeller edge, as described in FIG. 1B.

Speed and power of the process equipment Likwifier used for the Examples were controlled using a variable frequency drive, model PowerFlex 525 AC drives, Allen-Bradley (manufacturer Rockwell Automation, Milwaukee, WI). A LabVIEW-based data acquisition program (manufacturer National Instruments) was used to record the Power, in kW units, and the speed frequency, in Hz, with data recording at a rate of 1 value per second recording interval. The variable frequency drive was connected to the RSLogix 5000 PLC (manufacturer Rockwell Automation, Milwaukee, WI) and RSView software was used to operate the HMI screen. As used herein, the term "NP" refers to abbreviation for net power, typically expressed in hp or equivalent kW units. Net power value represents the total power measured under mixing load filled with the batch subtracted by the power measured under no mixing load in the empty vessel for a set speed. As used herein, the term "NP/M" refers to the abbreviation for net power per unit mass, typically expressed in W/kg, where the mass is equivalent to the batch size weight.

As used herein, the terms "negative log viscosity ratio" or "negative log viscosity reduction ratio" refer to the negative of the logarithm of the finished batch or final batch viscosity or batch sample divided by the initial or reference viscosity. The reference viscosity is typically measured with a TA Instruments rheometer (of New Castle, DE) with a parallel plate fixture in oscillatory mode, with the value reported typically corresponding to complex viscosity in Pa-s at a frequency of 1 rad/s. The reference viscosity for 10% wt SAP is prepared by combining 10 g SAP with 90 g deionized water to achieve 10% wt SAP; sample was stirred by hand in a beaker and then hydrated overnight to form swollen SAP solution with no degradation step. The reference viscosity for 20% wt SAP is defined as an extrapolated value obtained from the linear regression fit of viscosity measurements from samples consisting of 2.5-10% wt SAP with deionized water; each sample was stirred by hand in a beaker and then hydrated overnight to form swollen SAP solution with no degradation step. The final viscosity is typically measured with a TA Instruments rheometer with either a concentric cylinder fixture or cone-plate fixture in steady mode, with the value reported typically corresponding to viscosity in Pa-s at a shear rate of 4 s−1. The final viscosity samples are all collected from the batch tank at the end of the batch or at the respective reported sample time. These viscosity measurement techniques are well known to those skilled in the art. The negative log viscosity ratio indicates the extent of the SAP degradation to PAA in orders of magnitude; as it is accepted by those skilled in the art that the lower the viscosity of a PAA solution the lower the molecular weight of the PAA is, at a fixed concentration.

As used herein, $M_w$ or MW is the weight average molecular weight, in kDa. The method typically used for measuring polymer molecular weight distributions is referred to as Gel Permeation Chromatography (GPC) with Multi-Angle Light Scattering (MALS) and Refractive Index (RI) Detection (GPC-MALS/RI), which permits the measurement of absolute weight average molecular weight $M_w$ of a polymer without the need for column calibration methods or standards. The GPC system allows molecules to be separated as a function of their molecular size. MALS and RI allow information to be obtained on the number average ($M_n$) and weight average ($M_w$) molecular weight. The $M_w$ distribution of water-soluble polymers like polyacrylate materials is typically measured by using a Liquid Chromatography system consisting generally of a pump system, an autosampler (e.g., Agilent 1260 Infinity pump system with OpenLab Chemstation software, Agilent Technology, Santa Clara, CA, USA), and a column set of appropriate dimensions (e.g., Waters ultrahydrogel guard column, 6 mm ID×40 mm length, two ultrahydrogel linear columns, 7.8 mm ID×300 mm length, Waters Corporation of Milford, Mass. USA) which is typically operated at 40'C. The column set comprises one or typically more subsequently connected columns with varying pore-sizes graded for different molecular weight polymers and columns are generally selected such to provide resolution of wide and relevant molecular weights range. Commonly, the mobile phase is for example 0.1 M sodium nitrate in water containing 0.02% sodium azide and is pumped at a flow rate of about 1 mL/min, isocratically. A multiangle light scattering (MALS) detector (e.g. DAWN®) and a differential refractive index (RI) detector (e.g. Wyatt Technology of Santa Barbara, Calif., USA) controlled by respective software packages, e.g. Wyatt Astra®, are used. A sample is typically prepared by dissolving polymer materials in the mobile phase at about 1 mg per ml and by mixing the solution for overnight hydration at room temperature. The sample is filtered through a membrane filter (e.g. a 0.8 μm Versapor filter, PALL, Life Sciences, NY, USA) into the LC autosampler vial using a syringe before the GPC analysis. A dn/dc (differential change of refractive index with concentration) value is typically measured on the polymer materials of interest and used for the number average and weight average molecular weights determination by the respective detector software.

As used herein, the term "CRC" refers to the centrifuge retention capacity, as typically measured according to EDANA method NWSP 241.0.R2. The CRC is a measurement used to characterize the SAP material and is considered well-known by those skilled in the art of such characterization.

As used herein, the term "PSD" refers to the particle size distribution, as typically measured according to ISO method 13322-2 and test methods compliant therewith. The term "D10" refers to the particle size diameter value where 10% of the total powder particles are smaller than this value. The term "D50" refers to the particle size diameter value where 50% of the total powder particles are smaller than this value. The term "D90" refers to the particle size diameter value where 90% of the total powder particles are smaller than this value. The PSD is a set of measurements used to characterize the SAP material and is considered well-known by those skilled in the art of such characterization.

As used herein, the term "Moisture %" refers to the percentage of total moisture content represented in a material or sample, as typically measured according to EDANA Moisture Content Test Method NWSP 230.0.R2 (15) or via a Moisture Analyzer (HX204 from Mettler Toledo, drying temperature 130° C., starting superabsorber weight 3.0 g (±0.5 g), stop criterion 1 mg/140 s). The Moisture % is a measurement used to characterize the SAP material and is considered well-known by those skilled in the art of such characterization.

Color analysis of the samples was measured using Labscan XE Spectrophotometer, instrument manufacturer Hunter Associates Laboratory Inc (of Reston, VA). The method uses 0°/45° optical geometry a 2.5 inch glass sample cup, sample cup opaque cover, ring and disk set and 1.75 inch port insert. The liquid sample is loaded to the level of the ring, covered with the disk inside the cup and the opaque cover is placed over the entire unit. The liquid is scanned in normal mode and color L*, a* and b* star values are recorded. It is well known by those skilled in the art that the b* value is a key indicator of yellowing.

Speed and power of the process equipment Likwifier used for the Examples were controlled using a variable frequency drive, model PowerFlex 525 AC drives, Allen-Bradley (manufacturer Rockwell Automation, Milwaukee, WI). A LabVIEW-based data acquisition program (manufacturer National Instruments) was used to record the Power, in kW units, and the speed frequency, in Hz, with data recording at a rate of 1 value per second recording interval. The variable frequency drive was connected to the RSLogix 5000 PLC (manufacturer Rockwell Automation, Milwaukee, WI) and RSView software was used to operate the HMI screen. As used herein, the term "NP" refers to abbreviation for net power, typically expressed in hp or equivalent kW units. Net power value represents the total power measured under mixing load filled with the batch subtracted by the power measured under no mixing load in the empty vessel for a set speed. As used herein, the term "NP/M" refers to the abbreviation for net power per unit mass, typically expressed in W/kg, where the mass is equivalent to the batch size weight.

III Materials Description

SAP material was sourced from commercial SAP used in a P&G production plant for finished product sold in the European Union. The SAP material was sieved through about 100 μm mesh and collected. The properties of the collected SAP material were as follows:
CRC of about 19.2 g/g
Moisture % of about 0.8%
PSD particle size: D10 of about 16.9 um; D50 of about 37.07 um; D90 of about 74.3 um Another SAP material (post-industrial) was sourced from commercial scrap diaper recycling machine used to mechanically break down scrap diapers which are not shipped to the market. Said machine utilized a separation process providing sifted SAP separate from the rest of the raw materials used in diaper production. The sifted postindustrial SAP may contain trace amounts of cellulose, modified cellulose, adhesives, polyolefin and/or polyethylene terephthalate and/or other plastics dust particles, generally not exceeding 5% wt. or 10% wt. from the overall weight of the extracted SAP. The properties of the collected SAP material were as follows:

CRC of about 28.1 g/g
Moisture % of about 1.1%
PSD particle size: D10 of about 174 um; D50 of about 307 um; D90 of about 489 um KPS material was sourced and manufactured from Sigma Aldrich, >99% purity potassium persulfate, CAS #7727-21-1.

NaPS material was sourced from VWR, manufactured by Acros Organics, >98% purity sodium peroxodisulfate, CAS #7775-27-1.

HPO material was sourced from VWR and manufactured by VWR Chemicals BDH, as 29%-32% HPO in aqueous solution, stabilized with sodium stannate, CAS #7722-84-1.

Deionized water was sourced by purifying city water through inline ion exchange resin bed filtration tank unit located at a P&G Technical Center where experiments were conducted.

Degradation Method

Unexpectedly, it has been found that the addition of the oxidizer enables the high shear mixer to deliver the high shear energy, as measured by power per mass, required for both SAP dispersion and the reaction of the oxidizer with SAP to produce soluble PAA, resulting in fast hydration and effective mass transfer accelerating the SAP depolymerization reaction. The Breddo Likwifier mixer with the High Shear Impeller delivers power per unit mass greater than about 20 W/kg, enabling concentrations of the SAP greater than about 2.5%. At higher SAP concentrations, it was found that the tank with a bottom-driven high shear impeller is preferred over other rotor stator high shear devices. The synergistic combination of the high shear mixing energy and the oxidizer results in superior mass transfer and faster chemical reactions as compared with the low-shear hand mixing bench scale experiments.

At the beginning, when the first aliquot of SAP is added, the SAP is dispersed in the tank forming a very viscous gel with the aqueous solution requiring both the Likwifier high shear impeller and scraper for mixing. The mixing power delivered to the liquid is controlled by adjusting the frequency which controls the impeller speed. The Likwifier high shear impeller configuration is required to energize the liquid delivering greater than 20 W/kg NP/M required. As the oxidizer is present in the water, the dispersion and chemical reaction start, and the power delivered to the liquid increases resulting in a synergistic benefit depolymerizing the SAP. This synergistic effect is the result of both the high shear mixing and the chemical reaction resulting in viscosity reduction further improving the mixing in the tank dramatically reducing the reaction time, a key benefit for manufacturing scale production. The reaction temperature greater than 60° C. is needed, as indicated above, the batch temperature was 85° C.

EXAMPLES

The materials used in the EXAMPLES below were sourced according to the Materials section. The SAP material in EXAMPLES 1 TO 8, as described in the Materials section, is a fine particle grade removed from SAP used on diaper production lines via about 100 um mesh before application in a diaper, and was selected as it is considered to be a worst-case particle size to process SAP due to fast particle swelling and hydration rates as compared to other SAP material forms. By contrast, in EXAMPLE 9, we used a larger particle size SAP collected in a scrap diaper processing line. Results reported in the EXAMPLES below were obtained according to the Methods and Measurements Description section.

Figure 11:
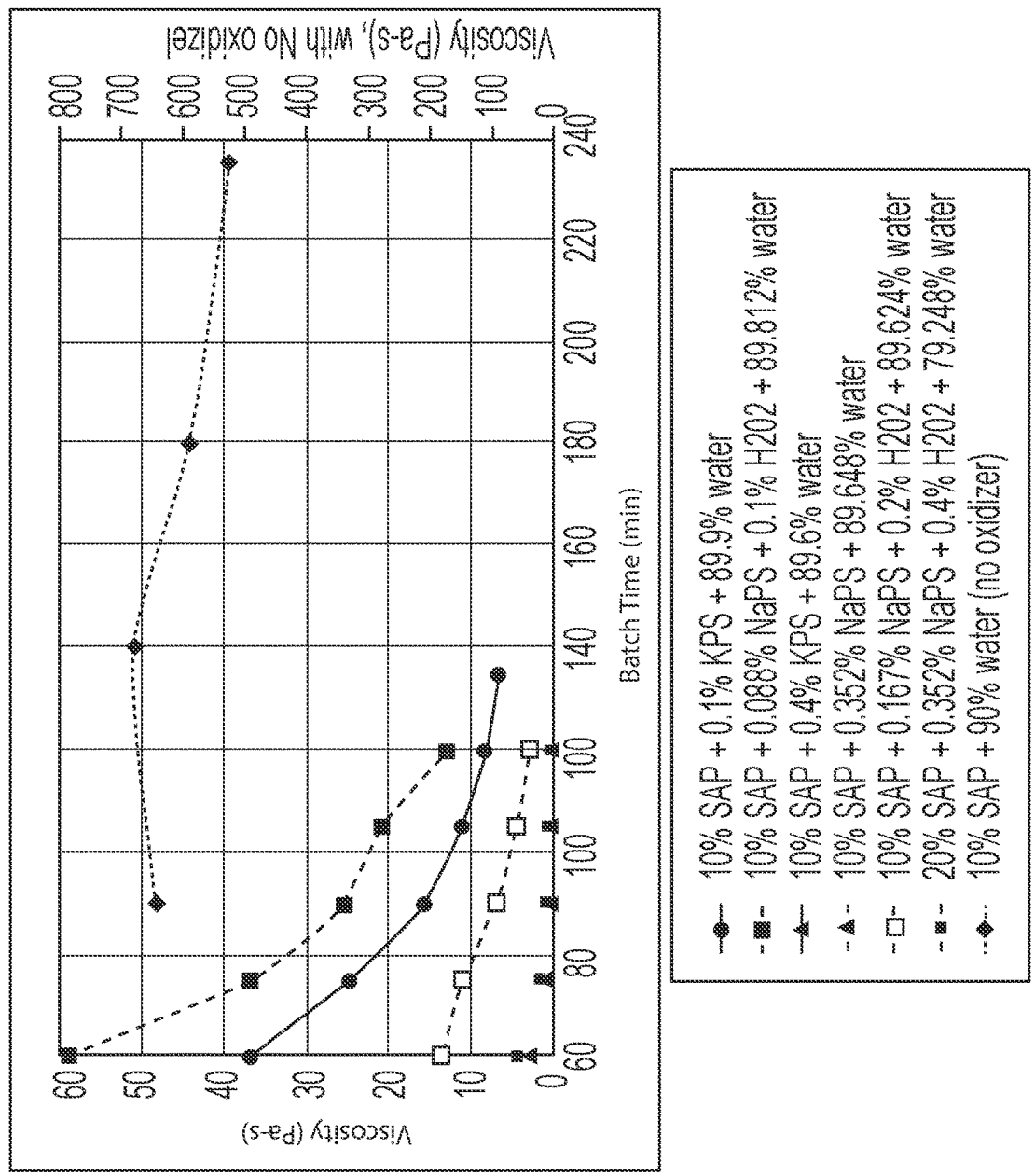
FIG. 11 is a graph showing the viscosity comparison including across all Examples, highlighting the level of degradation achieved. The viscosity of each sample (in Pa-s) is plotted as a function of time (in min.). For the batch containing no oxidizer as a control, the viscosity (in Pa-s) is plotted on a secondary vertical axis to the right side of the graph.

Inventive EXAMPLES 1 to 9 show that the negative logarithm of the viscosity ratio of the final product to the reference viscosity (i.e., orders of magnitude reduction in the final product stream viscosity relative to the reference viscosity) increases with combination of high NP/M mixing process, concentration of chemical oxidizer, temperature, and batch time. The results from these inventive EXAMPLES are shown in TABLE 2 and FIG. 11

Example 1

Figure 1A:
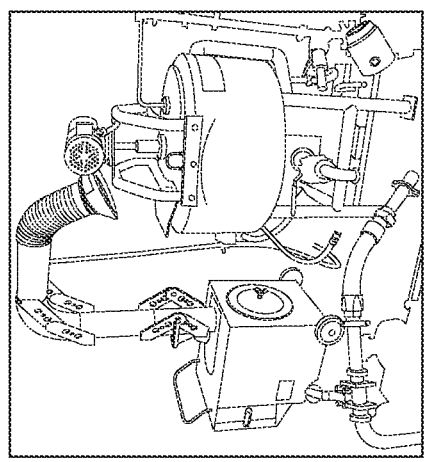
FIG. 1A is a picture of a High shear blender unit, Breddo Likwifier (EnSight Solutions, LLC, Kansas City, MO., 64161, USA), Model LORWWSS, 25 gal (equivalent to about 0.1 m$^3$), 10 hp motor (equivalent to about 7.5 kW), with bottom high shear impeller, vessel wall scraper, and jacketed for heating.

Batch of about 45 kg was prepared using the 25 Gal (equivalent to about 0.1 m3) Breddo Likwifier Model #LORWWSSD-25 (manufactured by EnSight Solutions, LLC, Kansas City, MO. 64161, USA) as shown in FIG. 1A-C. Deionized water was added to the vessel and heated to about 85° C. Solution of KPS premix was prepared by dissolving the quantity of KPS specified in TABLE 1 with deionized water and dividing into four individual aliquots of approximately 1 liter each. The SAP specified in TABLE 1 was also pre-weighed and divided into four individual aliquots. TABLE 1 describes the composition used.

The first aliquot of KPS was added to the batch, followed by the first aliquot of SAP and mixed using the high shear blender for over 15 min.; and, then, the process was repeated with the other 3 aliquots. At the beginning, when the first aliquot of SAP is added, the SAP is dispersed in the tank forming a very viscous gel with the aqueous solution requiring both the Likwifier high shear impeller and scraper for mixing. The mixing power delivered to the liquid is controlled by adjusting the frequency which controls the impeller speed. The Likwifier high shear impeller configuration is required to energize the liquid delivering greater than 20 W/kg NP/M required. As the oxidizer is present in the water, the dispersion and chemical reaction start, and the power delivered to the liquid increases resulting in a synergistic benefit depolymerizing the SAP. This synergistic effect is the result of both the high shear mixing and the chemical reaction resulting in viscosity reduction further improving the mixing in the tank dramatically reducing the reaction time, a key benefit for manufacturing scale production. The reaction temperature greater than 60° C. is needed, as indicated above, the batch temperature was 85° C. Thus, the viscosity of the final batch was 0.21 Pa·s, with a Negative Log Viscosity reduction of 4.65. The PAA molecular weight of the final batch was 141 kDa, the lowest reported value from the examples.

Figures 2A, 2B:
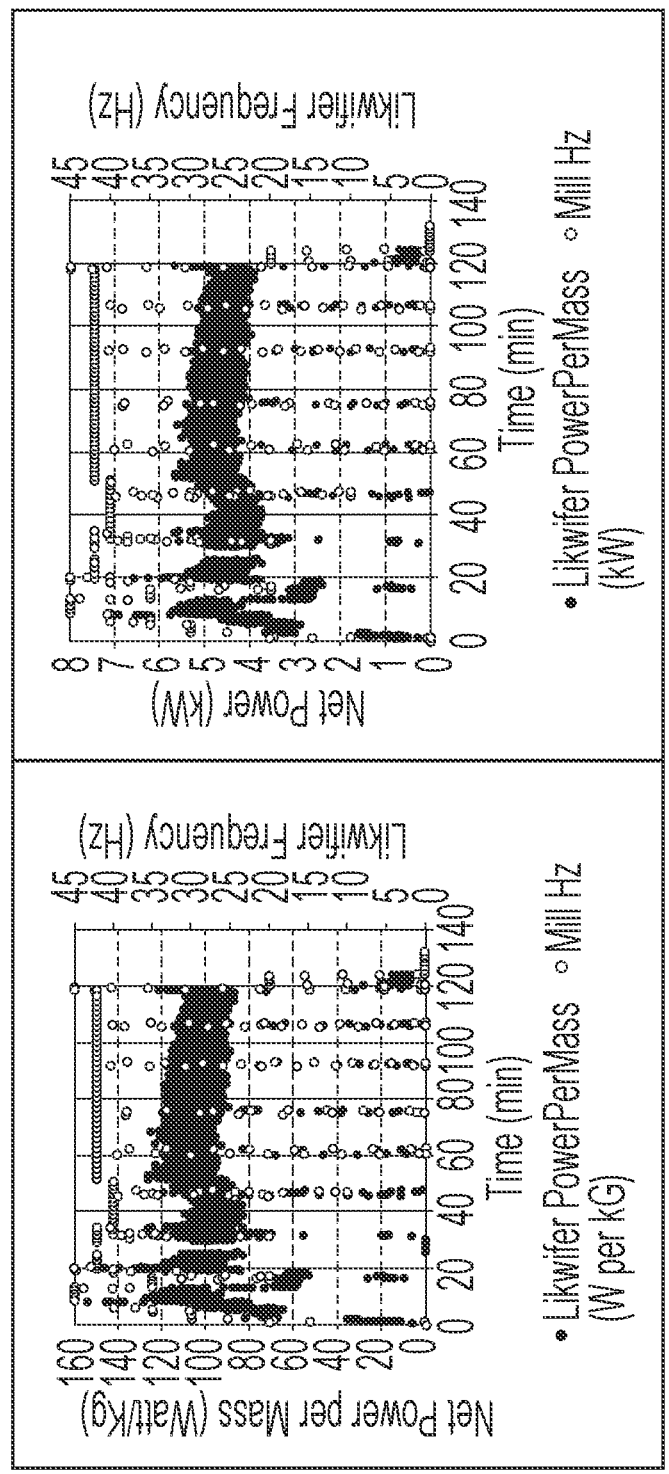
FIG. 2A is a graph showing the power data collected for Example 1. Mixing NP/M (in W/kg) and Frequency (in Hz) as a function of time (in min.).
FIG. 2B is a graph showing the power data collected for Example 1. Mixing net power (in kW) and Frequency (in Hz) as a function of time (in min.).

The Net Power was measured and collected during the run, and the NP/M was evaluated. FIGS. 2A and 2B show the NP/M and Net Power as function of time during: a) dispersion step with the four additions, and b) depolymerization/reaction step, for a total of 120 min.

Example 2

A 45 kg batch was prepared using same equipment as EXAMPLE 1 and as shown in FIG. 1A-C. Deionized water was added to the vessel and heated to 85° C. Solution of NaPS premix was prepared by dissolving the quantity of NaPS specified in TABLE 1 with deionized water and dividing into four individual aliquots of approximately 1 liter each. The SAP specified in TABLE 1 was also pre-weighed and divided into four individual aliquots. TABLE 1 describes the composition used. The molarity of NaPS added to the batch is equivalent to the molarity of KPS added in EXAMPLE 1, which is represented by the NaPS wt % concentration target described in TABLE 1.

The first aliquot of NaPS was added to the batch, followed by the first aliquot of SAP and mixed using the high shear blender for over 15 min.; and, then, the process was repeated with the other 3 aliquots.

Figures 3A, 3B:
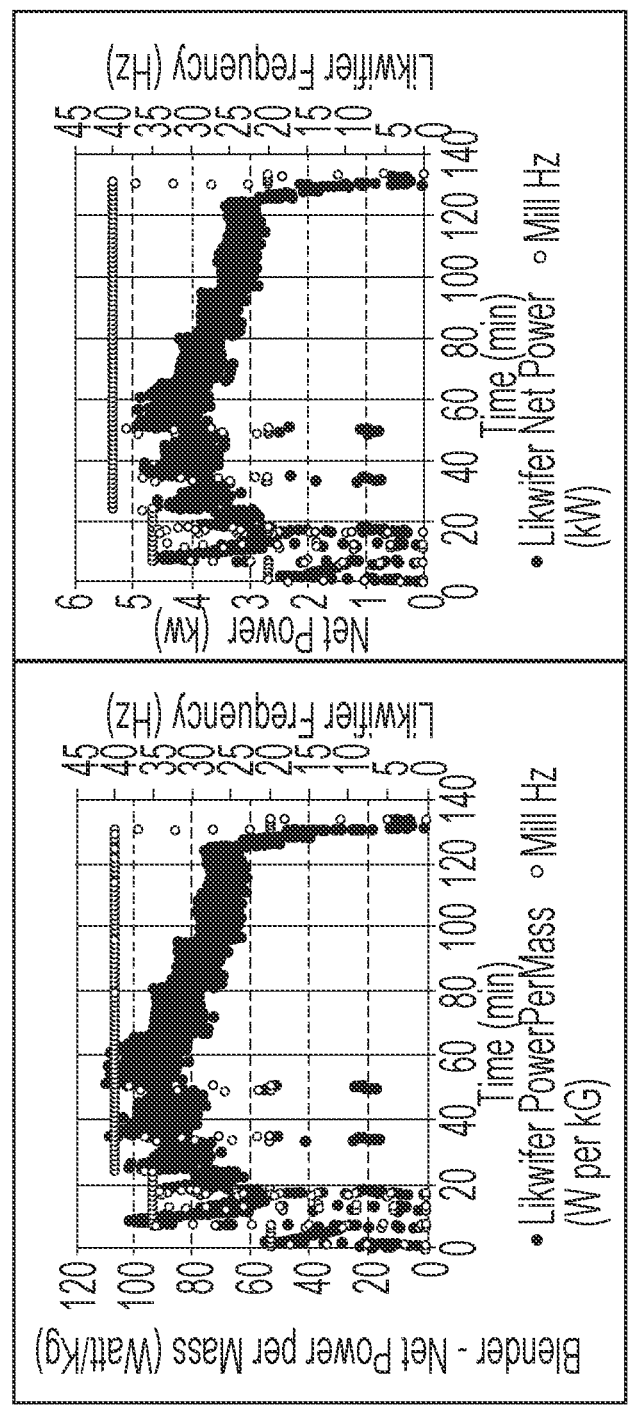
FIG. 3A is a graph showing the power data collected for Example 2. Mixing NP/M (in W/kg) and Frequency (in Hz) as a function of time (in min.).
FIG. 3B is a graph showing the power data collected for Example 2. Mixing net power (in kW) and Frequency (in Hz) as a function of time (in min.).

The Net Power was measured during the run, and the NP/M was evaluated. FIGS. 3A and 3B show the NP/M and Net Power as function of time during: a) dispersion step with the four additions, and b) depolymerization/reaction step, for a total of 120 min.

The viscosity of the final batch was 0.19 Pa·s, its negative viscosity ratio 4.69 and the PAA molecular weight was 184 kDa.

Example 3

A 45 kg batch was prepared using same equipment as EXAMPLE 1 and as shown in FIG. 1A-C. Deionized water was added to the vessel and heated to 85° C. Solution of NaPS premix was prepared by dissolving the quantity of NaPS specified in TABLE 1 with deionized water and dividing into four individual aliquots of approximately 250 milliliter each. The SAP and 30% HPO specified in TABLE 1 was also pre-weighed and divided into four individual aliquots. TABLE 1 describes the composition used. The concentration of 30% HPO specified in TABLE 1 is equivalent to about 0.1% wt HPO total active in the batch (i.e. 0.33 wt % of 30% HPO stock solution is equivalent to about 0.1% wt of pure HPO active).

The first aliquot of NaPS and HPO was added to the batch, followed by the first aliquot of SAP and mixed using the high shear blender for over 15 min.; and, then, the process was repeated with the other 3 aliquots.

Figures 4A, 4B:
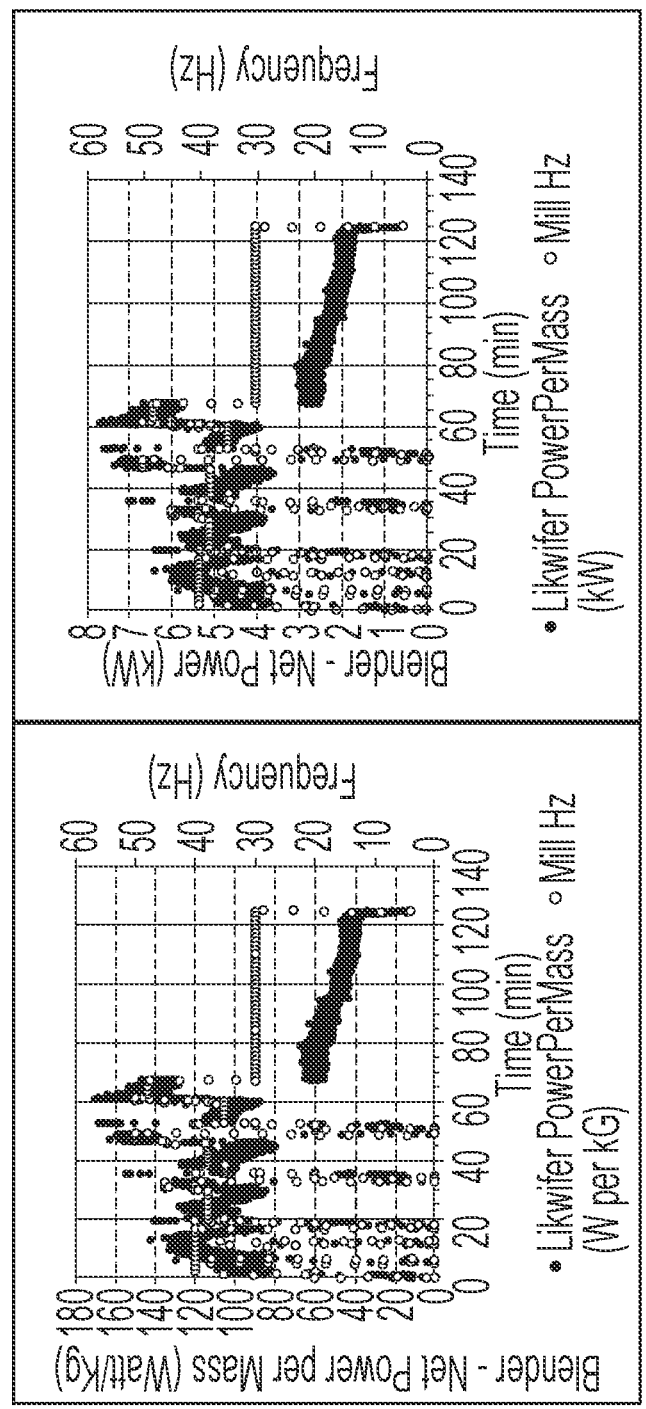
FIG. 4A is a graph showing the power data collected for Example 3. Mixing NP/M (in W/kg) and Frequency (in Hz) as a function of time (in min.).
FIG. 4B is a graph showing the power data collected for Example 3. Mixing net power (in kW) and Frequency (in Hz) as a function of time (in min.).

The Net Power was measured during the run, and the NP/M was evaluated. FIGS. 4A and 4B show the NP/M and Net Power as function of time during: a) dispersion step with the four additions, and b) depolymerization/reaction step, for a total of 120 min.

The viscosity of the final batch was 2.94 Pa·s, its negative viscosity ratio 3.5 and the PAA molecular weight was 215 kDa.

Example 4

A 45 kg batch was prepared using same equipment as EXAMPLE 1 and as shown in FIG. 1A-C. Deionized water was added to the vessel and heated to 85° C. Solution of KPS premix was prepared by dissolving the quantity of KPS specified in TABLE 1 with deionized water and dividing into four individual aliquots of approximately 250 milliliter each. The SAP specified in TABLE 1 was also pre-weighed and divided into four individual aliquots. TABLE 1 describes the composition used.

The first aliquot of KPS was added to the batch, followed by the first aliquot of SAP and mixed using the high shear blender for over 15 min.; and, then, the process was repeated with the other 3 aliquots.

Figures 5A, 5B:
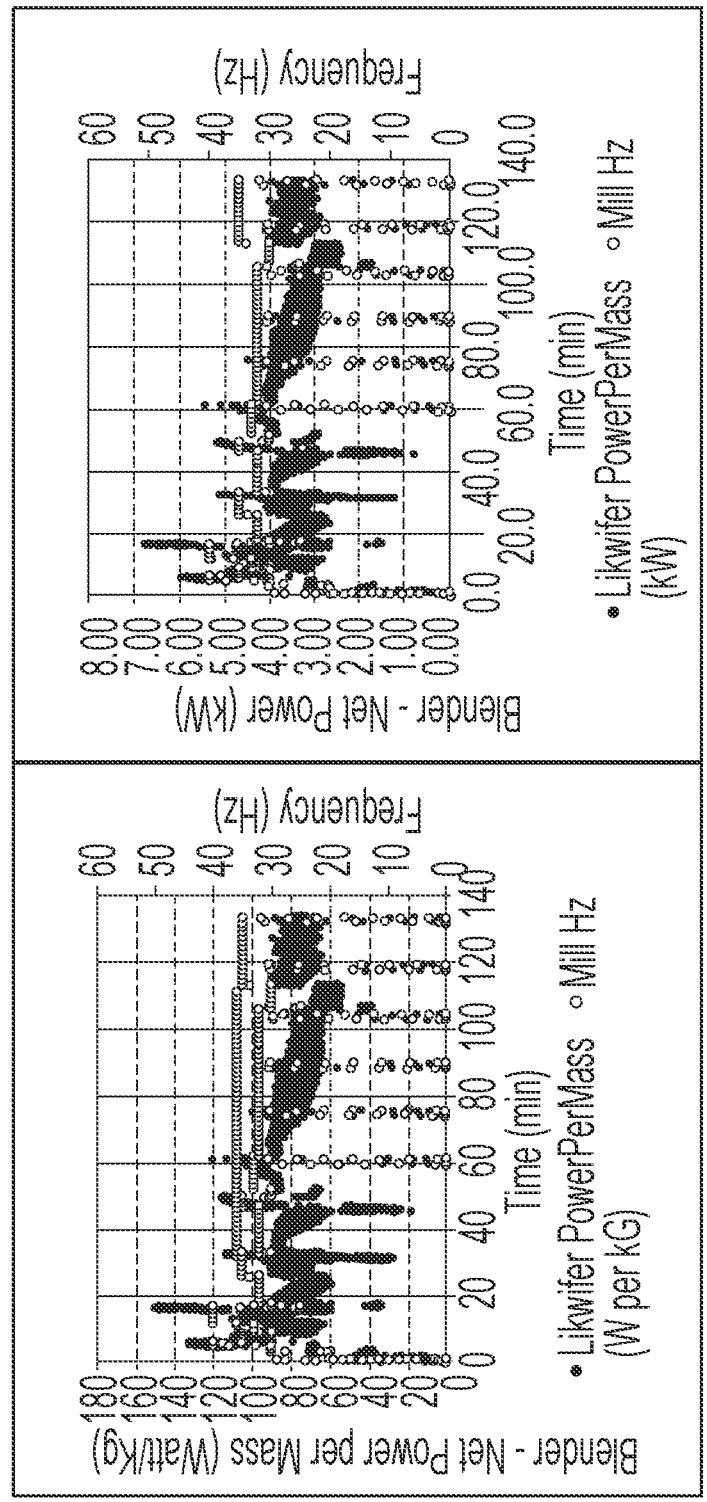
FIG. 5A is a graph showing the power data collected for Example 4. Mixing NP/M (in W/kg) and Frequency (in Hz) as a function of time (in min.).
FIG. 5B is a graph showing the power data collected for Example 4. Mixing net power (in kW) and Frequency (in Hz) as a function of time (in min.).

The Net Power was measured during the run, and the NP/M was evaluated. FIGS. 5A and 5B show the NP/M and Net Power as function of time during: a) dispersion step with the four additions, and b) depolymerization/reaction step, for a total of 135 min.

The viscosity of the final batch was 6.6 Pa·s, its negative viscosity ratio 3.15 and the PAA molecular weight was 346 kDa.

Example 5

A 45 kg batch was prepared using same equipment as EXAMPLE 1 and as shown in FIG. 1A-C. Deionized water was added to the vessel and heated to 85° C. Solution of NaPS premix was prepared by dissolving the quantity of NaPS specified in TABLE 1 with deionized water and dividing into four individual aliquots of approximately 500 milliliter each. The SAP and 30% HPO specified in TABLE 1 was also pre-weighed and divided into four individual aliquots. TABLE 1 describes the composition used. The concentration of 30% HPO specified in TABLE 1 is equivalent to about 0.2% wt HPO total active in the batch (i.e. 0.67 wt % of 30% HPO stock solution is equivalent to about 0.2% wt of pure HPO active).

The first aliquot of NaPS and HPO was added to the batch, followed by the first aliquot of SAP and mixed using the high shear blender for over 15 min; and, then, the process was repeated with the other 3 aliquots.

Figures 6A, 6B:
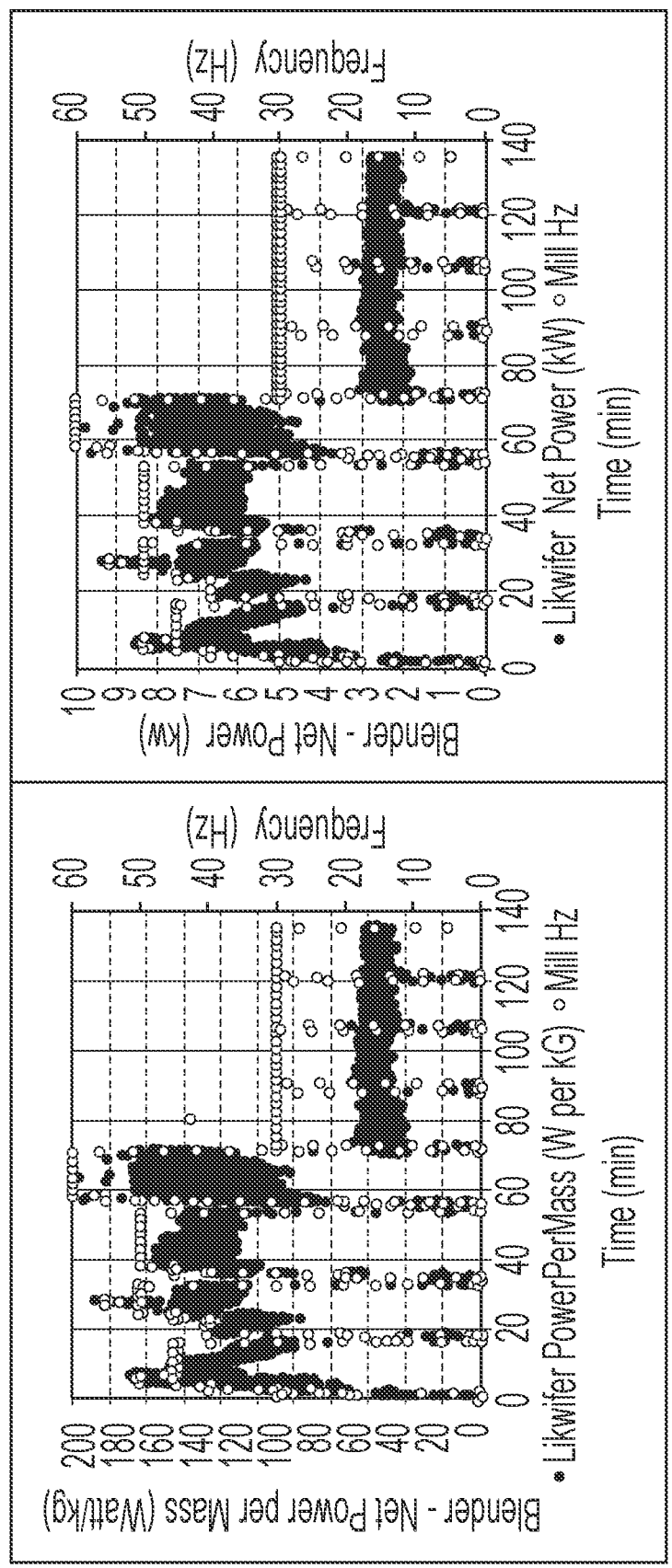
FIG. 6A is a graph showing the power data collected for Example 5. Mixing NP/M (in W/kg) and Frequency (in Hz) as a function of time (in min.).
FIG. 6B is a graph showing the power data collected for Example 5. Mixing net power (in kW) and Frequency (in Hz) as a function of time (in min.).

The Net Power was measured during the run, and the NP/M was evaluated. FIGS. 6A and 6B show the NP/M and Net Power as function of time during: a) dispersion step with the four additions, and b) depolymerization/reaction step, for a total of about 120 min.

The viscosity of the final batch was 0.42 Pa·s, its negative viscosity ratio 4.34 and the PAA molecular weight was 146 kDa.

Example 6

A 45 kg batch was prepared using same equipment as EXAMPLE 1 and as shown in FIG. 1C. Deionized water was added to the vessel and heated to 85° C. Solution of NaPS premix was prepared by dissolving the quantity of NaPS specified in TABLE 1 with deionized water and dividing into four individual aliquots of approximately 1000 milliliter each. The SAP and 30% HPO specified in TABLE 1 was also pre-weighed and divided into four individual aliquots. TABLE 1 describes the composition used. The concentration of 30% HPO specified in TABLE 1 is equivalent to about 0.4% wt HPO total active in the batch (i.e. 1.33 wt % of 30% HPO stock solution is equivalent to about 0.4% wt of pure HPO active).

The first aliquot of NaPS and HPO was added to the batch, followed by the first aliquot of SAP and mixed using the high shear blender for over 15 min.; and, then, the process was repeated with the other 3 aliquots.

Figures 7A, 7B:
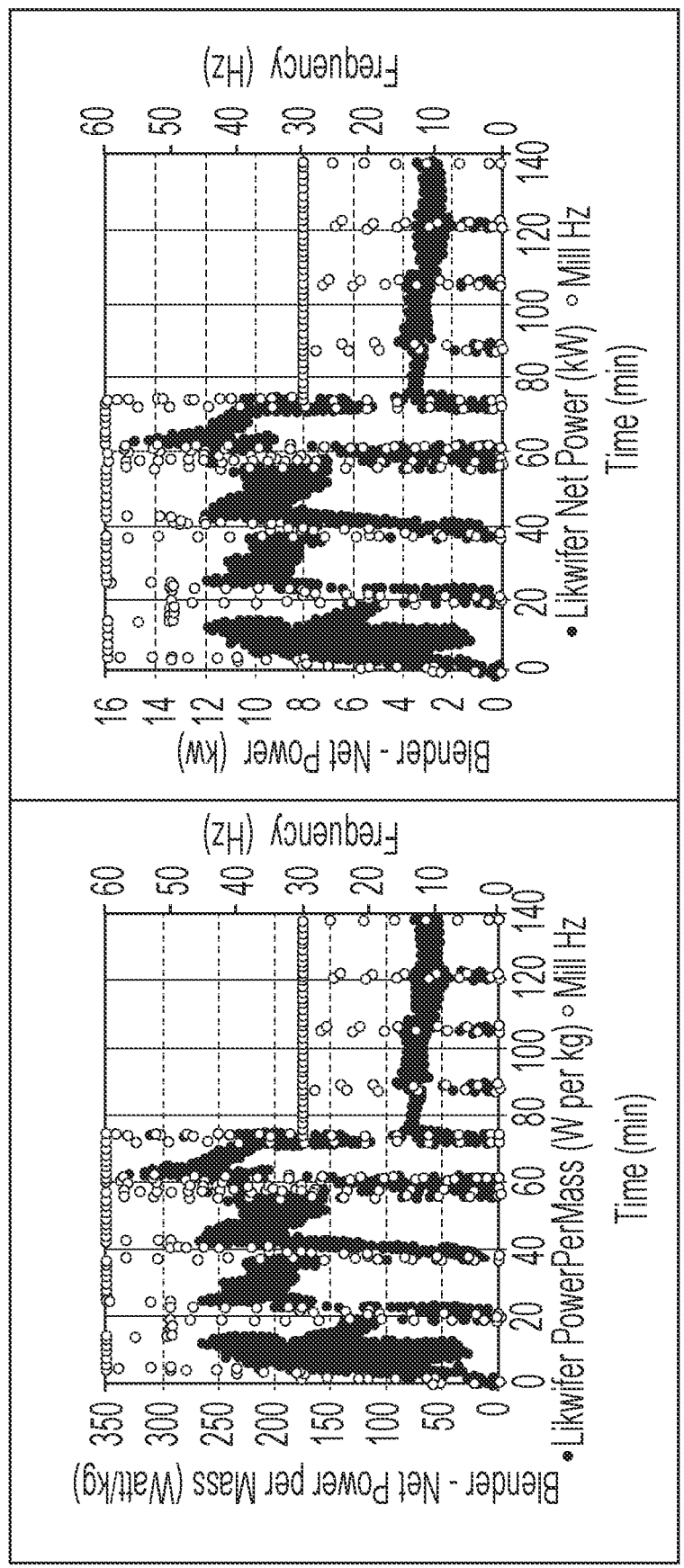
FIG. 7A is a graph showing the power data collected for Example 6. Mixing NP/M (in W/kg) and Frequency (in Hz) as a function of time (in min.).
FIG. 7B is a graph showing the power data collected for Example 6. Mixing net power (in kW) and Frequency (in Hz) as a function of time (in min.).

The Net Power was measured during the run, and the NP/M was evaluated. FIGS. 7A and 7B show the NP/M and Net Power as function of time during: a) dispersion step with the four additions, and b) depolymerization/reaction step, for a total of about 120 min.

The viscosity of the final batch was 12.8 Pa·s, its negative viscosity ratio 3.23 and the PAA molecular weight was 207 kDa.

Example 7

In order to assess the limitations of the high shear mixing process without a chemical reaction, a 45 kg comparative batch was prepared using same equipment as EXAMPLE 1 and as shown in FIG. 1A-C. For this SAP with no-oxidizer (no KPS, no NaPS) batch, TABLE 1 describes the composition used. Deionized water was added to the vessel and heated to 85° C. The SAP was pre-weighed and divided into two individual aliquots of 2.5% wt each.

The first aliquot of 2.5% of SAP was added to the batch and mixed using the high shear blender for over 15 min; and then the process was repeated with the second aliquot. After the second 2.5% aliquot addition, the motor was unable to achieve steady state and showing signs of over-load within the first one minute, as indicated by the motor current over the spec limit of 12 Amps Several attempts to were made to overcome motor overload from high viscosity load by adjusting frequency/speed, however the motor failed at about 23 min. into the batch time and the run was discontinued after 54 min. had elapsed attempting to re-start the motor without success. The SAP concentration inside the tank at time of failure was approximately 5% wt.

Figures 8A, 8B:
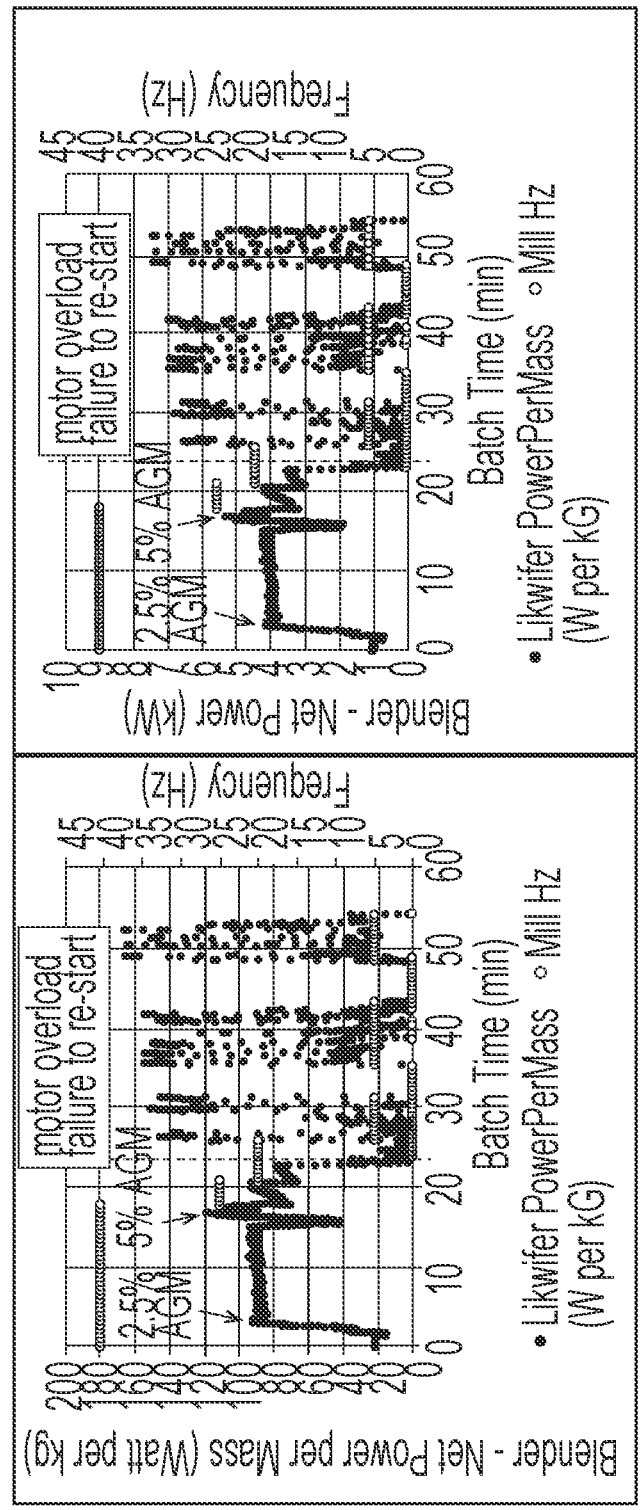
FIG. 8A is a graph showing the power data collected for Example 7. Mixing NP/M (in W/kg) and Frequency (in Hz) as a function of time (in min.).
FIG. 8B is a graph showing the power data collected for Example 7. Mixing net power (in kW) and Frequency (in Hz) as a function of time (in min.).

The Net Power was measured during the run, and the NP/M was evaluated. FIGS. 8A and 8B show the NP/M and Net Power as function of time during the dispersion step with the two additions for a total of about 54 min before discontinuing.

Example 8

In order to assess the limitations of the high shear mixing process without a chemical reaction, a 45 kg comparative batch was prepared using same equipment as EXAMPLE 1 and as shown in FIG. 1C. For this SAP with no-oxidizer (no KPS, no NaPS) batch, TABLE 1 describes the composition used. Deionized water was added to the vessel and heated to 85° C. The SAP was pre-weighed and divided into four individual aliquots of 2.5% wt each.

The first aliquot of 2.5% of SAP was added to the batch and mixed using the high shear blender for over 15 min.; and, then, the process was repeated with the other 3 aliquots.

Figures 9A, 9B:
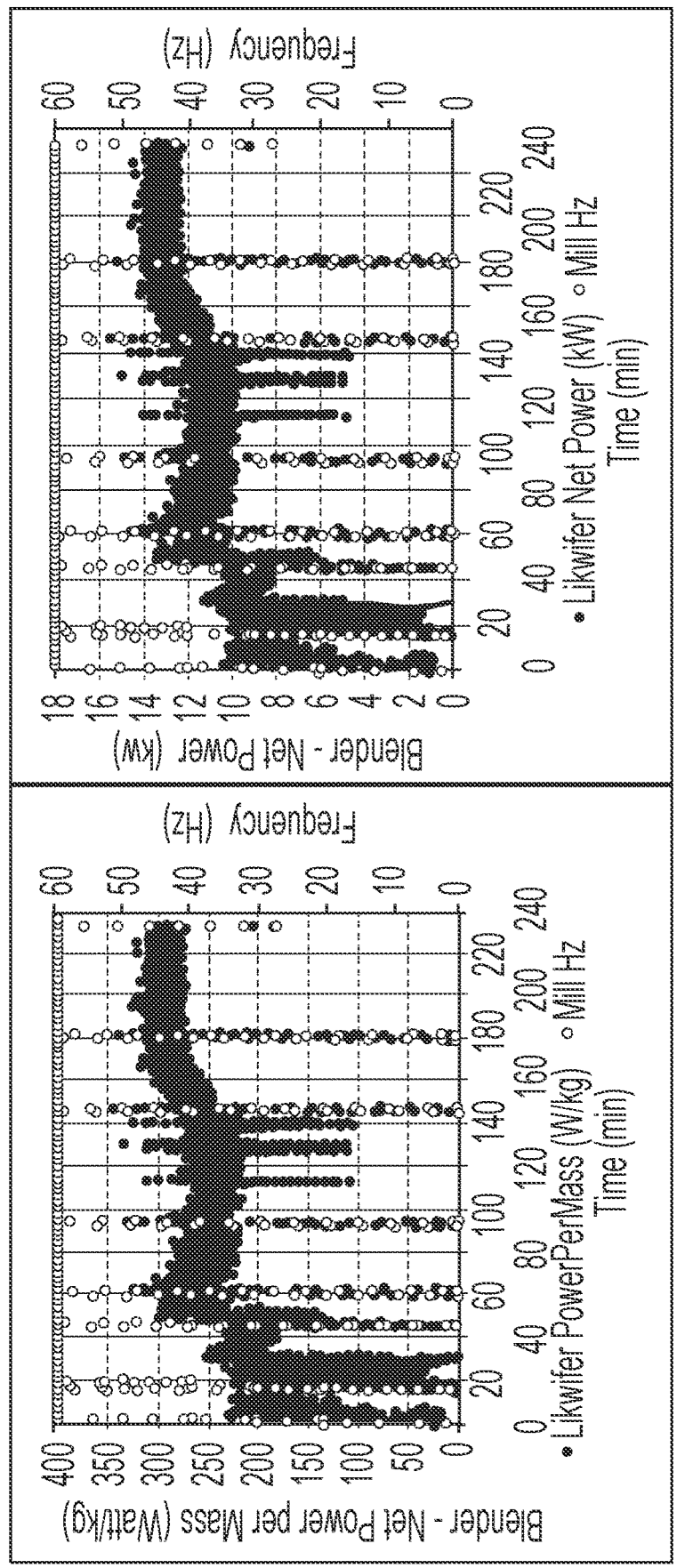
FIG. 9A is a graph showing the power data collected for Example 8. Mixing NP/M (in W/kg) and Frequency (in Hz) as a function of time (in min.).
FIG. 9B is a graph showing the power data collected for Example 8. Mixing net power (in kW) and Frequency (in Hz) as a function of time (in min.).

The Net Power was measured during the run, and the NP/M was evaluated. FIGS. 9A and 9B show the NP/M and Net Power as function of time during: a) dispersion step with the four additions, and b) depolymerization/reaction step, for a total of about 235 min.

The viscosity of the final batch was 527 Pa·s, and its negative viscosity ratio 1.24.

Example 9

In order to assess the effect of particle size, a 45 kg batch was prepared using same equipment as EXAMPLE 1 and as shown in FIG. 1C. The batch making and composition was same as described in Example 6. The SAP material with larger particle size was collected in a scrap diaper processing line.

Figures 10A, 10B:
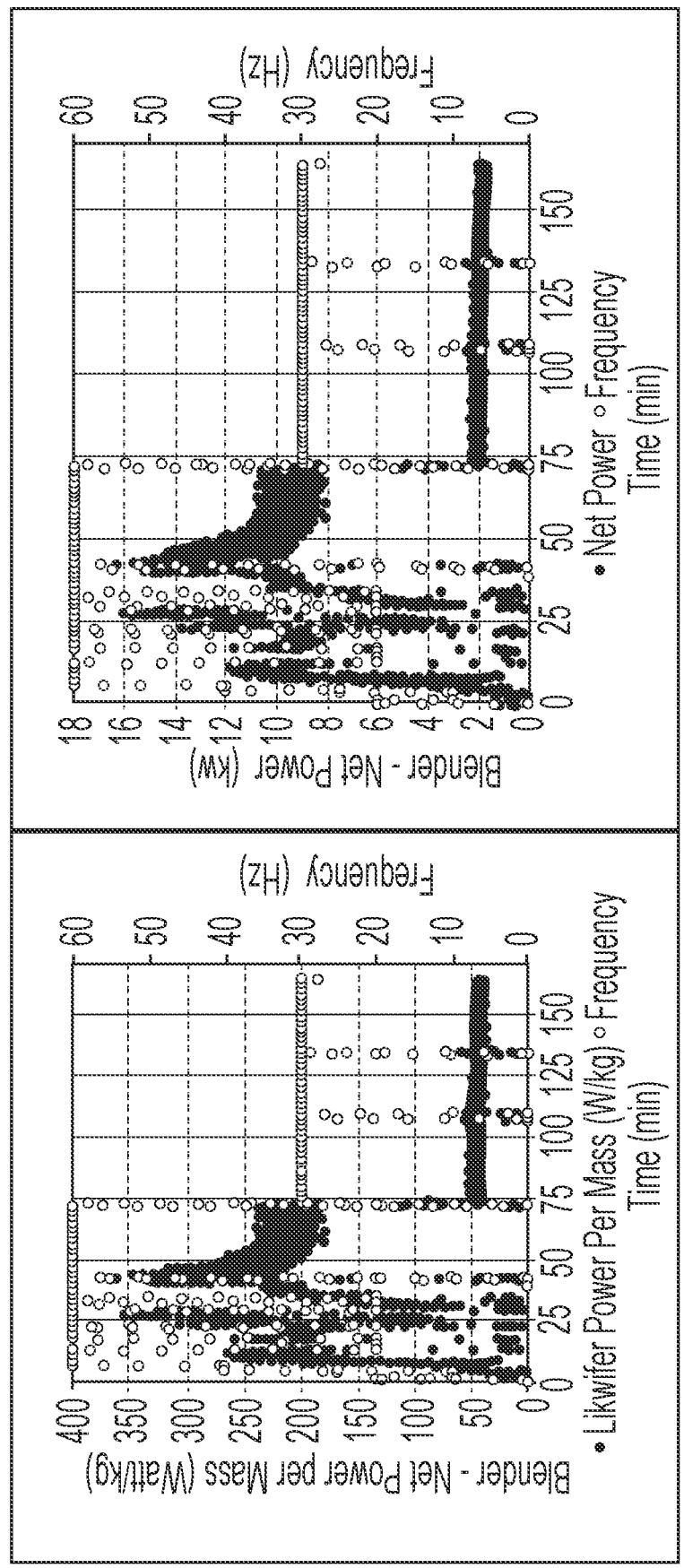
FIG. 10A is a graph showing the power data collected for Example 9. Mixing NP/M (in W/kg) and Frequency (in Hz) as a function of time (in min.).
FIG. 10B is a graph showing the power data collected for Example 9. Mixing net power (in kW) and Frequency (in Hz) as a function of time (in min.).

The Net Power was measured during the run, and the NP/M was evaluated. FIGS. 10A and 10B shows the NP/M and Net Power as function of time during: a) dispersion step with the four additions, and b) depolymerization/reaction step, for a total of about 165 min.

The viscosity of the final batch was 0.23 Pa·s, and the PAA molecular weight was 84 kDa.

For 10% SAP concentration, FIGS. 10A and 10B show the reduction in viscosity indicating depolymerization as function of time, including data from above Examples. Increasing the oxidizer concentration from 1% to 4% of the SAP weight results in a large reduction in viscosity. The addition of the bleaching agent HPO further reduces the viscosity when combined with the 1% NaPS resulting in an intermediate viscosity reduction as compared to runs with oxidizer concentration of about 1% and 4% of the SAP. HPO combined with the 2% NaPS as in EXAMPLE 5 results in a viscosity reduction similar as runs with total oxidizer concentration of about 4% of the SAP. For 20% SAP concentration, FIGS. 10A and 10B including data from EXAMPLE 6 shows reduction in viscosity indicating depolymerization as function of time at the higher SAP concentration as well. The bleaching agent HPO provides the additional benefit of lightening the color reducing the undesirable colors so as to make them unobservable by consumers and acceptable for reincorporation into virgin AGM.

The Negative Log Viscosity Ratio values documented in TABLE 2 indicate the large viscosity reduction resulting from the effective depolymerization reaction of SAP to PAA using a high shear mixer with NP/M>20 W/kg and an oxidizer (KPS; NaPS). The smallest viscosity reduction (and highest viscosity) was obtained with 0% NaPS. The largest viscosity reduction (and lowest viscosity) was obtained with 4% NaPS. Appropriately low viscosity is required for the reincorporation of the PAA into poly-acrylic-based SAP.

As expected, TABLE 2 shows that higher oxidizer concentration yields lower molecular weight, for example 4% KPS and 4% NaPS samples resulted in 141 kDa and 181 kDa respectively. The combination of the oxidizer, 1% NaPS, and bleaching agent, 1% HPO, resulted in molecular weight 32% higher than the average of the two 4% oxidizer runs, and 61% lower than that of 1% KPS. The combination of the oxidizer, 2% NaPS, and bleaching agent, 2% HPO, resulted in molecular weight similar to the two 4% oxidizer runs (4% KPS and 4% NaPS). This shows the benefits of combining the oxidizer and the bleaching agents resulting in lower viscosity, lower molecular weight, and lighter finished product batch.

Please note the % oxidizer listed in above paragraphs is as compared to % SAP basis level. For example, KPS oxidizer level of 1% of the SAP refers to 0.1 wt % KPS total when the SAP level is 10 wt % SAP.

The HPO is both an oxidizer and bleaching agent that react with the SAP with a significant improvement in color. TABLE 3 shows the color data and photos for four batches containing 10% wt SAP with varying levels of NaPS (from 1% to 4% wt) and bleaching agent HPO (from 0% wt to 2% wt) and one batch containing 20% wt SAP with 2% wt NaPS and 2% wt HPO on % SAP basis. For the 1% wt NaPS batches, the addition of 1% wt HPO lightened the PAA formed during the depolymerization reaction, resulting in a 70% reduction of the Lab-b value. For the 2% and 4% wt NaPS batches, the addition of 2% wt HPO lightened the PAA formed during the depolymerization reaction, resulting in a 82% reduction of the Lab-b value. The 20% SAP batch with HPO added also exhibited low Lab-b value of 2.08, with similar range to other batches containing HPO as indicated in TABLE 3. This is an important property because the lighter PAA color can be used for the recycling PAA by combining with virgin PAA to make SAP containing recycled PAA especially for disposable absorbent articles.

The compositions of the batch and experimental conditions from inventive EXAMPLES 1 to 8 are summarized in TABLE 1 below. In TABLE 1, values for wt % recorded represent the material wt % as compared to total formula concentration.

TABLE 1

| Example # | Formula name (quick reference, % SAP basis) | SAP [wt %] | KPS [wt %] | NaPS [wt %] | 30% HPO [wt %] | Water [wt %] | Batch size [kg] | Batch time [min] |
|---|---|---|---|---|---|---|---|---|
| 1 | "4% KPS" | 10 | 0.4 | — | — | 89.6 | 45 | 120 |
| 2 | "4% NaPS" | 10 | — | 0.352 | — | 89.648 | 45 | 120 |
| 3 | "1% NaPS + 1% HPO" | 10 | — | 0.088 | 0.33 | 89.582 | 45 | 120 |
| 4 | "1% KPS" | 10 | 0.1 | — | — | 89.9 | 45 | 135 |
| 5 | "2% NaPS + 2% HPO" | 10 | — | 0.176 | 0.67 | 89.157 | 45 | 120 |
| 6 | "2% NaPS + 2% HPO" | 20 | — | 0.352 | 1.33 | 78.315 | 45 | 120 |
| 7 | "0% KPS" | 5 | — | — | — | 95 | 45 | 54 |
| 8 | "0% NaPS" | 10 | — | — | — | 90 | 45 | 235 |
| 9 | "2% NaPS + 2% HPO" | 20 | — | 0.352 | 1.33 | 78.315 | 45 | 165 |

TABLE 2

| Formula from EXAMPLE # | Reference Viscosity [Pa-s] | Final Viscosity [Pa-s] | Batch Time [min] | Negative LOG (Viscosity Ratio), [—] | Final Mw [kDa] |
|---|---|---|---|---|---|
| 1 | 9283 | 0.21 | 120 | 4.65 | 141 |
| 2 | 9283 | 0.19 | 120 | 4.69 | 184 |
| 3 | 9283 | 2.94 | 120 | 3.50 | 215 |
| 4 | 9283 | 6.6 | 135 | 3.15 | 346 |
| 5 | 9283 | 0.42 | 120 | 4.34 | 146 |
| 6 | 21841 | 12.8 | 120 | 3.23 | 207 |
| 7 | — | 116 | 54 | — | — |
| 8 | 9283 | 527 | 235 | 1.24 | — |
| 9 | — | 0.23 | 165 | — | 84 |

TABLE 3

Figure 12A:
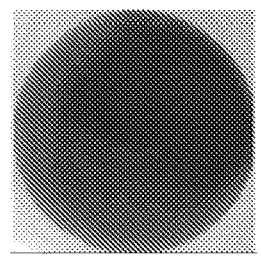
FIG. 12A-12E are photos of Samples from TABLE 3.
Figure 12B:
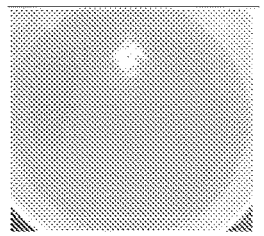
Figure 12C:
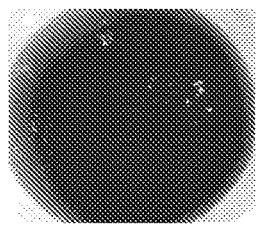
Figure 12D:
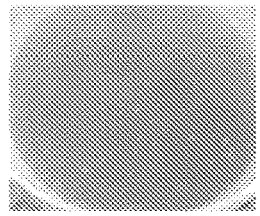

| Composition | Process | Color Data | | | |
|---|---|---|---|---|---|
| | | L* | a* | b* | Photo |
| 10% SAP + 0.088% NaPS + 89.912% DI Water | Likwifier, 85° C., Batch time 120 min | 64.17 | −1.2 | 20.03 | FIG. 12A |
| 10% SAP + 0.088% NaPS + 89.812% DI Water + 0.1% HPO | HPO Added Stepwise During Batch Run. Likwifier, 85° C., Batch Run time: 120 min | 65.7 | −0.45 | 5.79 | FIG. 12B |
| 10% SAP + 0.352% NaPS + 89.648% DI Water | Likwifier, 85° C., Batch time 120 min | 61.5 | 2.1 | 41.8 | FIG. 12C |
| 10% SAP + 0.176% NaPS + 89.624% DI Water + | HPO Added Stepwise During Batch Run. Likwifier, 85° C., | 65.02 | −0.04 | 7.46 | FIG. 12D |

TABLE 3-continued

Figure 12E:
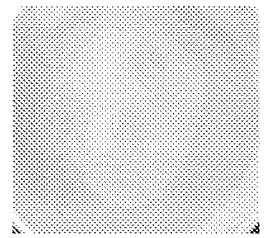

| Composition | Process | Color Data | | | |
|---|---|---|---|---|---|
| | | L* | a* | b* | Photo |
| 0.2% HPO 20% SAP + 0.352% NaPS + 79.248% DI Water + 0.4% HPO | Batch Run time: 120 min HPO Added Stepwise During Batch Run. Likwifier, 85° C., Batch Run time: 120 min | 64.4 | −1.1 | 2.08 | FIG. 12E |

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for degrading acrylic acid based superabsorbent polymer (SAP) to poly(acrylic acid) PAA comprising:
    a. Forming a solution, wherein the solution comprises an oxidizer soluble salt in water at a dissolution temperature and a dissolution concentration;
    b. Dispersing SAP into the solution, forming an SAP dispersion, using a mixer with power input NP/M greater than about 20 W/kg solution; and
    c. Reacting said oxidizer with said SAP at a reaction temperature and for a reaction time to produce a PAA solution.
2. The process according to claim 1 wherein said reaction time is from about 10 min to about 240 min.
3. The process according to claim 1 wherein said reaction time is from about 10 min to about 180 min.
4. The process according to claim 1 wherein said reaction time is from about 10 min to about 90 min.
5. The process according to claim 1 wherein said reaction temperature is from about 60° C. to about 120° C.
6. The process according to claim 1 wherein said reaction temperature is from about 70° C. to about 110° C.
7. The process according to claim 1 wherein said reaction temperature is from about 70° C. to about 90° C.
8. The process according to claim 1, wherein said PAA solution and said SAP dispersion each have a viscosity, and the viscosities form a viscosity ratio; and wherein the negative logarithm of said viscosity ratio is greater than about 3 and less than about 5.
9. The process according to claim 1, wherein said PAA has a molecular weight from about 1 to about 1,000 kDa.
10. The process according to claim 1, wherein said PAA has a molecular weight from about 50 to about 500 kDa.
11. The process according to claim 1, wherein the SAP concentration is from about 1% to about 30%.
12. The process according to claim 1, wherein the SAP concentration is from about 2% to about 30%.
13. The process according to claim 1, wherein the said SAP is added to the solution in one or more doses.
14. The process according to claim 1, wherein the SAP has an SAP Particle Size Distribution and wherein the SAP Particle Size Distribution is reported as D50 and is from about 5 to about 5,000 microns.
15. The process according to claim 14, wherein the D50 is from about 5 to about 1,000 microns.
16. The process according to claim 14, wherein the D50 is from about 3 to about 500 microns.
17. The process according to claim 1, wherein the oxidizer is persulfate with concentration from about 0.25 to about 5 g per 100 g of SAP.
18. The process according to claim 1, wherein the oxidizer is persulfate with concentration from about 0.8 to about 2 g per 100 g of SAP.
19. The process according to claim 1, further comprising the step of adding a bleaching agent.
20. The process according to claim 19, wherein the bleaching agent is Hydrogen Peroxide with a concentration from about 0.25 to about 5 g per 100 g of SAP.
21. The process according to claim 20, wherein the bleaching agent is Hydrogen Peroxide with a concentration from about 0.8 to about 2 g per 100 g of SAP.
22. The process according to claim 19, wherein the PAA exhibit Hunter LAB Color value of b* less than 15.
23. The process according to claim 19, wherein the PAA exhibit Hunter LAB Color value of b* less than 10.
24. The process according to claim 19, wherein the PAA exhibit Hunter LAB Color value of b* less than 7.
25. The process according to claim 1, where SAP is provided from pre-existing recycled post-consumer superabsorbent polymer material, and/or obtained from pre-existing recycled post-industrial superabsorbent polymer material or combinations thereof.
26. The process according to claim 1, wherein the SAP is in the form of at least one of particles, fibers, flakes, foams, nonwoven fabrics, woven fabrics, or mixtures thereof.

\* \* \* \* \*